(12) United States Patent
Wang et al.

(10) Patent No.: US 11,466,979 B2
(45) Date of Patent: Oct. 11, 2022

(54) METHOD OF MEASURING LONGITUDE DEFORMATION OF BLADES BY DIFFERENTIAL RADIATION BETWEEN BLADES AND CASING

(71) Applicant: University of Electronic Science and Technology of China, Sichuan (CN)

(72) Inventors: Chao Wang, Sichuan (CN); Zezhan Zhang, Sichuan (CN); Peifeng Yu, Sichuan (CN); Yi Niu, Sichuan (CN); Ying Duan, Sichuan (CN); Xueke Gou, Sichuan (CN); Yekui Zhong, Sichuan (CN); Anmei Qiu, Sichuan (CN); Pei Huang, Sichuan (CN); Yuehai Zhang, Sichuan (CN); Shan Gao, Sichuan (CN); Jing Jiang, Sichuan (CN)

(73) Assignee: University of Electronic Science and Technology of China, Sichuan (CN)

( * ) Notice: Subject to any disclaimer, the term of this patent is extended or adjusted under 35 U.S.C. 154(b) by 0 days.

(21) Appl. No.: 17/151,681

(22) Filed: Jan. 19, 2021

(65) Prior Publication Data

US 2021/0140761 A1 May 13, 2021

(30) Foreign Application Priority Data

Feb. 17, 2020 (CN) .......................... 202010095532.3

(51) Int. Cl.
*G01B 11/16* (2006.01)
(52) U.S. Cl.
CPC .................................. *G01B 11/16* (2013.01)

(58) Field of Classification Search
CPC ...... G01B 21/047; G01B 11/25; G01B 21/04; G01B 11/24; G01B 11/00; G01B 11/02;
(Continued)

(56) References Cited

U.S. PATENT DOCUMENTS

| 4,011,017 A | * | 3/1977 | Feuerstein | ............ F01D 21/003 |
| | | | | 356/241.6 |
| 4,266,346 A | * | 5/1981 | Olschefski | ............... G01B 7/12 |
| | | | | 33/550 |

(Continued)

FOREIGN PATENT DOCUMENTS

| CN | 205107679 U | * | 3/2016 | ......... A61B 17/3403 |
| CN | 106644093 A | * | 5/2017 | ............ G01J 5/0088 |

(Continued)

*Primary Examiner* — Michael P Stafira

(57) ABSTRACT

The present invention discloses a method of measuring longitude deformation of blades. The radiation and rotation speed of the blade are collected by an optical probe and a synchronized rotation sensor. The stretch of the blade is able to be determined by the obvious change in the light intensity detected by the optical probe. The precision servo motor keeps driving the optical probe to move upward. The collected radiation is compared with the radiation collected on the previous point. The stretch of the blade is calculated based on position of the blade tip which is determined by the time when the high level radiation from the blade is disappeared. The longitude deformation of the blade is calculated by plugging the stretch into the deformation equation. Mapping the calculated deformation with the number of the blade calculated with rotation speed synchronizing signals to achieve the deformation of all the blades.

1 Claim, 2 Drawing Sheets

(58) Field of Classification Search
CPC ..... G01B 11/14; G01B 11/022; G01B 11/026;
G01B 11/002; G01B 17/02; G01B 5/012;
G01B 7/285; G01B 11/005; G01B 11/04;
G01B 11/2513; G01B 11/2545; G01B
21/042; G01B 21/16; G01B 15/00; G01B
5/205; G01B 7/14; G01B 7/28; G01B
7/30; G01B 9/02; G01B 9/04; G01B
11/03; G01B 11/0616; G01B 11/0625;
G01B 11/08; G01B 11/16; G01B
11/2408; G01B 11/2518; G01B 11/30;
G01B 11/303; G01B 21/30; G01B 21/32;
G01B 5/008; G01B 7/008; G01B 7/02;
G01B 7/26; G01B 9/08; G01B 11/168;
G01B 11/2416; G01B 11/2441; G01B
11/2522; G01B 11/2536; G01B 17/00;
G01B 17/025; G01B 17/04; G01B 21/00;
G01B 21/20; G01B 5/0004; G01B 5/207;
G01B 5/285; G01B 7/00; G01B 7/105;
G01B 7/16; G01B 7/284; G01B 7/312
See application file for complete search history.

(56) References Cited

U.S. PATENT DOCUMENTS

| | | | | | |
|---|---|---|---|---|---|
| 5,575,754 | A | * | 11/1996 | Konomura | G01B 11/02 356/241.6 |
| 5,968,059 | A | * | 10/1999 | Ellis | A61B 17/32002 606/167 |
| 6,109,783 | A | * | 8/2000 | Dobler | G01J 5/0022 374/131 |
| 6,992,315 | B2 | * | 1/2006 | Twerdochlib | F01D 5/005 382/152 |
| 8,713,775 | B2 | * | 5/2014 | Zhang | B23P 6/02 356/241.3 |
| 2005/0199832 | A1 | * | 9/2005 | Twerdochlib | F01D 5/005 250/559.29 |
| 2007/0272042 | A1 | * | 11/2007 | Goldfine | G01B 7/285 73/865.8 |
| 2007/0296964 | A1 | * | 12/2007 | Nishimura | G01N 21/954 356/241.4 |
| 2015/0300920 | A1 | * | 10/2015 | DeAscanis | G01M 15/14 356/614 |

FOREIGN PATENT DOCUMENTS

| | | | | | |
|---|---|---|---|---|---|
| CN | 109716077 | A | * | 5/2019 | ............. G01H 1/006 |
| CN | 111226024 | A | * | 6/2020 | ........... F01D 21/003 |
| EP | 0907077 | A2 | * | 4/1999 | |
| EP | 2312266 | B1 | * | 6/2015 | ............. G01B 11/14 |

* cited by examiner

METHOD OF MEASURING LONGITUDE DEFORMATION OF BLADES BY DIFFERENTIAL RADIATION BETWEEN BLADES AND CASING

CROSS REFERENCE OF RELATED APPLICATION

This application claims priority under 35 U.S.C. 119(a-d) to CN 202010095532.3 filed Feb. 17, 2020.

BACKGROUND OF THE PRESENT INVENTION

Field of Invention

The present invention relates to aircraft engine measuring technology field, and more particularly to a method of measuring longitude deformation of blades.

Description of Related Arts

The thrust-to-weight ratio of the aircraft engine and the turbine inlet temperature keep increasing and a turbine blade inlet temperature reaches 2000-2250K. Under complex actions of high temperature, high rotational speed, complicated air flow exciting force and high centrifugal loads, the blades easily fail, which cause engine failure and severe aviation incident. With progressing in basic experiment of low cycle fatigue, failure modes of blades are mainly creep fatigue failure under high temperature instead of conventional static strength failure. Under high temperature and high rotational speed, the blades tend to creep and stretch when centrifugal force applied. The fatigue limit is shortened, the blades even crack and the engine is damaged from inside when the creep failure reaches a certain level. When the longitude creep stretch of the blade is longer than 0.5% of the proper length, the fatigue limit of the blade is exceeded.

In order to guarantee a normal working condition, the longitude deformation of the blade must be measured. Researches are carried out domestically and abroad. The conventional technology is to fix a strain gauge on a surface or two ends of an object under test, such as in the Chinese patent application CN200410002434.1 which discloses a method of measuring the longitude deformation by fixing the tip and root of the blade. The conventional method is not practical for blade with high rotating speed. Telemetering resistance or slip resistance strain gauge is widely adopted for practical use while the ambient temperature is limited around 900K due to technical problems such as thermal drift and gauge attachment. The mounting of strain gauge is costly, the service life of the strain gauge is short, and the weight and volume of the sensors compromise the aerodynamic characteristic of the blade. The application of the method is limited. The conventional contact deformation measuring method is challenged by difficulty in lead.

SUMMARY OF THE PRESENT INVENTION

An object of the present invention is to provide a method of measuring the longitude deformation of the blade by optical monitoring, which analyzing the heat load and vibration fatigue of the blade in real-time under actual conditions. The device for measuring a longitudinal deformation of blades comprises: an optical probe for collecting radiation settled on an engine cover with a precision servo motor driving the optical probe to stretch out and draw back in radial direction, a synchronized rotation sensor settled on an end of a rotation axis, an optic-electric conversion module, a filtering and amplifying module, a data collecting and processing module. The optical probe is driven deep into the casing to collect radiations which are transferred to the optic-electric conversion module through optical fibers. The radiations are converted to electric signals for following data processing. The longitude deformation of the blade is achieved by combine the electric signals with the output signals of the synchronized rotation sensor.

The theory for measuring the longitude deformation adopted by the present invention is as follow: the temperature between the blades is lower than the temperature of the blades while the blades rotating in high speed propelled by high temperature gas and the heat radiation from the rotational blade is collected by the optical probe mounted on the engine cover; every time when the collected radiant intensity changes obviously, a set of even pulse waveform is achieved by a detector as shown in FIG. 2; once a bottom end of the optical probe leaves the blade tip, the reflection mirror faces the low temperature casing and a high level radiation from the blade changes to a low level radiation from the casing; the longitude deformation of the blade is thus determined.

While the probing needle is drawing upward from the blade root until the optical probe is pointed to the blade tip, the collected radiations is still a set of even pulse waveform; the optical probe keeps moving upward; the length of the blade are different and the radiations from the blade without deformation or with minor deformation are not able to be collected; the low level radiation from the casing is collected instead; the radiations from the blade with large deformation is still able to be collected which are the high level waveform, as shown in FIG. 3. The high level waveform indicates the blade with longitude deformation. The order and index of the blade is able to be determined according to the output signals of the synchronized rotation sensor. While the optical probe keeps moving upward from the blade tip, the high level waveforms keep missing. When the high level waveform is missing, compare the waveform with the last recorded waveform to determine the position of the blade tip, as shown in FIG. 4. The distance from the top end of the optical probe to the flange on the engine cover Li is recorded then. The creep stretch is calculated by subtracting the distance from the flange to the top end of the optical probe L when the optical probe is on the blade root and the proper length of a blade L0. When the optical probe is no longer able to detect the blade surface, the probe is in a gaseous environment, the bottom end reflection mirror faces the casing and the collected radiation is low level waveform in FIG. 1, as shown in FIG. 5. The blade deformation value is achieved by plugging an expression L, Li and L0 in the equation.

The technical solution of the present invention of the method of measuring a longitudinal deformation of blades by differential radiations comprises following steps of:

step 1: measuring the proper length of the blade from the root to the tip when the blade is motionless;

step 2: collecting the radiation from the blade root by the optical probe and recording the initial position of the optical probe when the turbine operating at steady state;

step 3: moving the optical probe along the longitude direction of the blade to the calculated blade tip by proper length; collecting the radiation while the blade completing one revolution; determining the blade corresponding to each peak in the radiation;

step 4: moving the optical probe along the longitude direction of the blade for a step; collecting the radiation while the blade completing one revolution; determining the corresponding relation between each peak and the respective peak recorded in the last cycle; determining whether a peak is missing, wherein if yes, go to step 5, if no, repeat step 4;

step 5: determining the blade corresponding to the missing peak; identifying the position of the optical probe as the blade tip corresponding to the missing peak; calculating the deformation of the blade based on the initial position and the proper length of the optical probe; repeating the step 4 until no peak in the collected radiation; finishing the radiation collecting.

Furthermore, the bit rate in the step 2 is over 160 Khz which is calculated based on three sampling points on each blade. The step 3 further comprises the following steps:

step 3.1: Fourier transforming the collected signals; filtering out the signals less than 350 Hz; filtering out the signals over 13 Khz; adopting amplitude threshold to calculate the frequency range of the wave crests over the threshold;

step 3.2: calculating each radiation voltage minus the third radiation voltage before the said radiation voltage within the frequency range calculated in the step 3.1; dividing the calculated result by the time intervals of sampling to achieved a slope of a curve, wherein if the slope is bigger than the preset threshold 0.5, then the said radiation voltage is a peak;

step 3.3 achieving an rotation speed synchronizing signal per revolution of the turbine; calculating a time interval of every two pulses of the rotation speed synchronizing signals; diving the calculated time interval by a number of the blades; achieving a corresponding time interval of each blade; subtracting the time interval of the rotation speed synchronizing signal pulses from the time corresponding to the peak value; dividing the subtracted time corresponding to the peak value by the corresponding time interval of each blade; achieving a serial number of the corresponding blade.

The optical probe in the present invention is driven deep into the casing to measure the pulse wave of the radiation of the blade tip and gaseous radiation. The radiation of the blade is separated from the casing due to the obviously different temperature. The lengths of the blade before deformation and after deformation are plugged into the equation to calculate the longitude deformation of the blade. The deformation of each blade is achieved by combining the difference of the low level signals and the rotation speed synchronizing signal collected each time.

DETAILED DESCRIPTION OF THE PREFERRED EMBODIMENT

Figure 1:
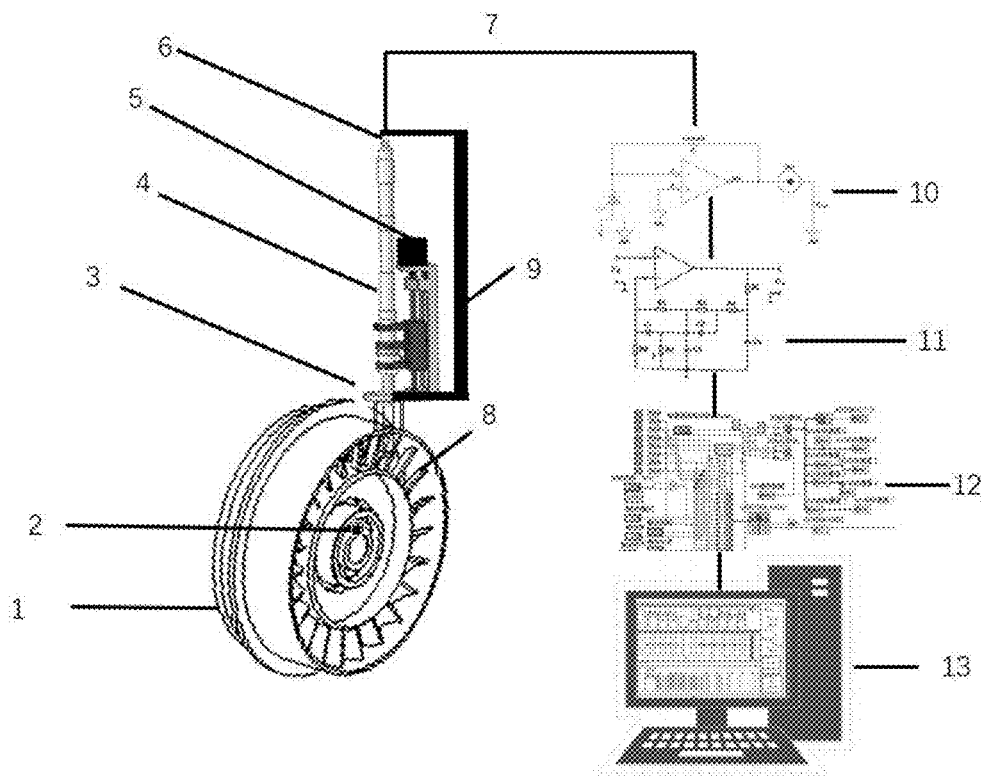
FIG. 1 is a perspective view of a deformation measuring device.

Referring to FIG. 1 of the drawings, a device for measuring a longitudinal deformation of blades in the present invention comprises: an optical probe 4 for collecting radiation settled on an engine cover 1, a precision servo motor 5 driving the optical probe 4 to stretch out and draw back in radial direction, a flange 3 for fixing the optical probe 4 and the engine cover 1, an automatic distant measure device 9 settled on the flange 3 and a top end of the optical probe 6, a synchronized rotation sensor 2 settled on an end of a rotation axis, an optic-electric conversion module 10, a filtering and amplifying module 11, a data collecting and processing module 12 and a master computer 13. The radiations from the blade 8 rotating in high speed are received by the optical probe 4, collected by a set of optical components and conducted by an optical fiber 7. The optical signals are transferred to electrical signals by the optic-electric conversion module 10 to prevent the sensors from being interfered by the high temperature. The converted signals are sent to the succeeding data collecting and processing module 12 which outputs the longitude deformation information.

Figure 2:
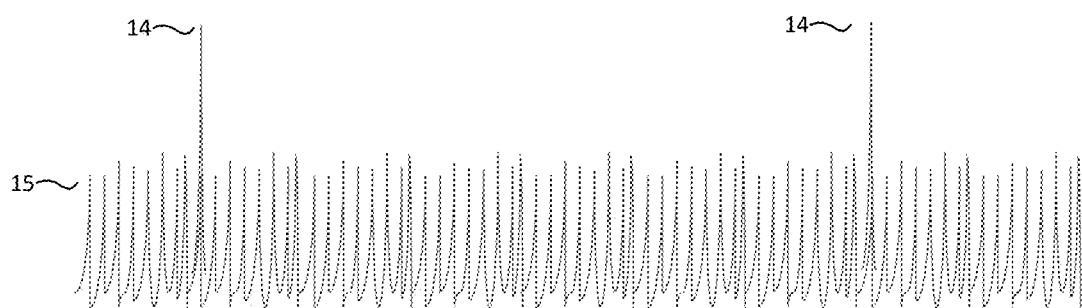
FIG. 2 is a waveform chart which displays the radiation when an optical probe moves from a blade root to a blade tip.

A method of measuring a longitudinal deformation of blades by differential radiations, comprising following steps of:

step 1: fixing the precision servo motor 5 with the optical probe 4; fixing the optical probe 4 on the engine cover 1 by the flange 3; fixing the automatic distant measure device 9 between the top end of the optical probe 6 and the flange 3, wherein the distance between the flange 3 and the top end of the optical probe 6 is able to be measured while the optical probe 4 moving forward and backward; driving the optical probe 4 moving forward to a blade root; measuring a distance L from the flange 3 to the top end of the optical probe 6;

The precision servo motor 5 drives the optical probe 4 to move upward in uniform speed until the optical probe 4 reaches the original blade tip without deformation to collect the radiation of the blade in the longitude direction. The blade 8 rotates in high speed while the optical probe 4 is being pulling out. The temperature between the blades 8 is higher than the temperature on the blade 8 and the collected radiations are continuous high level and low level pulse signals as shown in the FIG. 2, wherein the rotation speed synchronizing signal 14 identifies the blade; the radiations between the blades 15 collected per revolution lie between two rotation speed synchronizing signal 14. Fourier transform is adopted to carry out spectral analysis of collected signals in order to avoid the interference of the engine on the radiation and the judgment on peak value and achieve the corresponding signal frequencies of the blade and gaseous noise. Various noises differ in frequency due to different features, based on which the frequencies are separated. The Butterworth filter is adopted with a cutoff frequency of the noise to filter the collected radiation. The noises of the engine are grouped under the following types: inherent noise, in-band noise and the noise caused by gas and incompletely combusted soot particles etc.

The power frequency interference of the turbine is around 50 hz while the frequency band with high-noise energy is 50-350 Hz. The signals below 350 Hz are low frequency noise. The low frequency spectrum is thus determined. The low frequency noise is filtered out by the high-pass Butterworth filter.

Slow-changing low frequency signals are collected while the turbine operating in an optimum condition. The noises caused by gas and soot particles etc. are normally high frequency signals. The high frequency noise spectrum is thus determined. The high frequency signals are round 13 Khz while the low frequency signals are round 10 Khz. The signals over 13 Khz are noise signals from inside the engine. The signals are separated from the noise according to the amplitude threshold of the signal frequency and noise frequency. The amplitude of the signals is higher than the noises, by which the signals are separated from the high frequency noise. The high frequency noise is filtered out by the low-pass Butterworth filter.

The waveform chart simply displaying the blade signals is achieved by the above noise analysis and filtering.

A method of slope is adopted for determining the position of the peak and identifying the peak comprises the following steps of: rotating the turbine at a speed of 10000 r/min, wherein altogether 80 blades are around the turbine and the sampling frequency is 160 Khz; calculating each radiation voltage (N) minus the collected N−3 radiation voltage within the frequency range calculated in the step 3.1; dividing the calculated result by the time intervals of sampling (three sampling points) to achieved a slope of a curve, wherein if the slope is bigger than the preset threshold 0.5, then the said radiation voltage is a peak and is the high level radiation from the blade 8; if the slope is less than the threshold, then the voltage is the low level radiation from the casing.

A method of mapping the peak value with the blade comprises the following steps of: calculating the time interval between two pulses of the synchronizing signal; dividing the calculated time interval by the number of the blades 8 to achieve the corresponding time interval of each blade 8; subtracting the time of the last rotation speed synchronizing signal from the time (abscissa) when the peak value is achieved; dividing the result by the corresponding time interval of each blade 8; achieving the number of the blade after the last rotation speed synchronizing pulse, wherein a specific blade is corresponding to each rotation speed synchronizing signal; identifying the blade with peak value by counting backwards from the specific blade by the achieved number of the blade.

Figure 3:
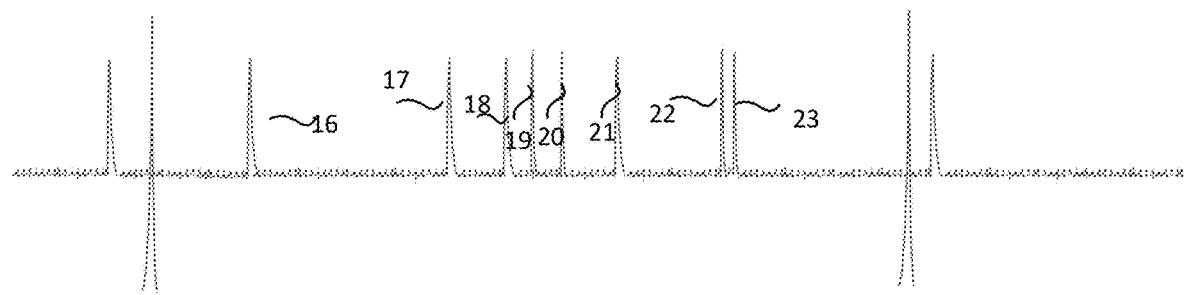
FIG. 3 is a radiation waveform chart which displays the longitude deformation of the blade collected after the optical probe exceeding an original position of the blade tip.

The precision servo motor 5 is pulled upward with a minimum resolution of 0.01 mm from the original blade tip. The precision servo motor 5 stops for 0.5 S per revolution to collect the radiation and record the length Li. The precision servo motor 5 keeps moving upward for another 0.01 mm after finishing the collection. The radiation is collected at an interval of 0.01 mm and the resolution of the measured deformation is 0.01 mm. As shown in the FIG. 3, the low level radiation indicates the signal between the blades 8 and the high level radiation indicates the signal from the blade 8 with longitude deformation. The signals 16-23 are from the blades 8 with longitude deformation.

Figure 4:
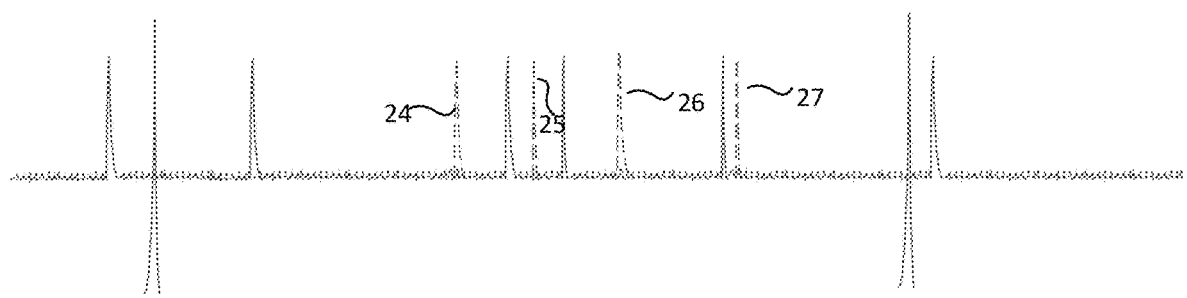
FIG. 4 is a waveform chart which displays the radiation of a next position after a signal is collected in the step 3 and the optical probe is driven by a motor.

The precision servo motor 5 is pulled upward by 0.01 mm to the next point to collect the radiation as shown in the FIG. 4. The radiation from the blade with minor deformation is not able to be detected and the optical probe 4 faces the casing with lower temperature while the radiation from the blade with obvious deformation is still able to be detected. Comparing the collected radiation with the signal collected from the previous point of 0.01 mm downward, the blade tip are indicated by the lost low level radiations 24-27. The deformation of the blade tip is calculated by plugging the length Li measured in the previous point, the distance L from the flange 3 to the top end of the optical probe 6 when the optical probe 4 is on the blade root, and the proper length L0 into the deformation equation, $$\varepsilon = \frac{L_i - L - L_0}{L_0} (i = 1, 2 \ldots n).$$

The rotation speed synchronizing signals are adopted for mapping the deformation with the specific blade. The collected radiation are compared with the radiation collected from the previous point and the distance Li and L are measured while the precision servo motor 5 keeps moving upward to calculate the deformation of all the blades.

Figure 5:
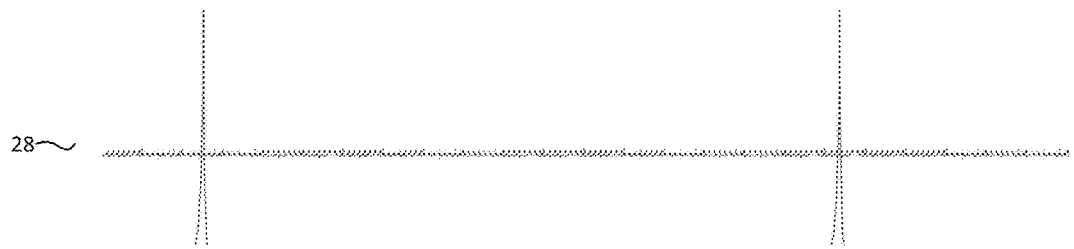
FIG. 5 is a waveform chart which displays the radiation when the optical probe is in a gaseous environment.

The optical probe 4 is pulling upward until a high-frequency pulse signal in the collected radiation disappears, which indicate the optical probe is in a gaseous environment and the collected radiation is from the casing. The collected signals are low level radiation from the casing, as shown in the FIG. 5. The previous state is the radiation collected from the blade with maximum longitude deformation. The precision servo motor 5 is pulled out from the combustor at full speed to protect the bottom end of the optical probe 4 and the optical lens. The collection is completed.

What is claimed is:

1. A device for measuring a longitudinal deformation of blades, comprising: an optical probe for collecting radiation settled on an engine cover, a precision servo motor driving the optical probe to stretch out and draw back in a radial direction, a flange for fixing the optical probe and the engine cover, an automatic distant measure device settled on the flange and a top end of the optical probe, a synchronized rotation sensor settled on an end of a rotation axis, an optic-electric conversion module, a filtering and amplifying module, a data collecting and processing module and a master computer; wherein the automatic distant measure device measures a distance between the flange and the top end of the optical probe while the optical probe moves forward and backward.

* * * * *